United States Patent
Kavacheri et al.

(10) Patent No.: US 6,557,036 B1
(45) Date of Patent: Apr. 29, 2003

(54) METHODS AND APPARATUS FOR SITE WIDE MONITORING OF ELECTRONIC MAIL SYSTEMS

(75) Inventors: Sathyanarayanan N. Kavacheri, Sunnyvale, CA (US); Nigel Simpson, Bainbridge, WA (US); Daryl A. Huff, Saratoga, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/520,865

(22) Filed: Mar. 7, 2000

Related U.S. Application Data (60) Provisional application No. 60/144,709, filed on Jul. 20, 1999.

(51) Int. Cl.⁷ .............................................. G06F 15/173
(52) U.S. Cl. ........................ 709/224; 709/206; 714/41
(58) Field of Search ................................. 709/203, 219, 709/206, 207, 224; 714/4, 5, 39, 41, 42, 43, 47

(56) References Cited

U.S. PATENT DOCUMENTS

| | | | | |
|---|---|---|---|---|
| 5,812,780 A | * | 9/1998 | Chen et al. | 395/200.54 |
| 5,913,041 A | * | 6/1999 | Ramanathan et al. | 395/200.63 |
| 6,167,431 A | * | 12/2000 | Gillies et al. | 709/203 |
| 6,304,892 B1 | * | 10/2001 | Bhoj et al. | 709/202 |

* cited by examiner

Primary Examiner—John A. Follansbee
(74) Attorney, Agent, or Firm—Beyer Weaver & Thomas LLP (57) ABSTRACT

A messaging system capable of providing monitoring capabilities of mail services provided by a mail server is disclosed. Monitoring of mail services can be done automatically without requiring a local administrator to have knowledge about the specific implementation details about mail services that are provided by the mail server. In addition, the messaging system provides the ability to perform a variety of monitoring tasks remotely.

20 Claims, 7 Drawing Sheets

METHODS AND APPARATUS FOR SITE WIDE MONITORING OF ELECTRONIC MAIL SYSTEMS

CROSS-REFERENCE TO A RELATED APPLICATIONS

This application takes priority under 35 U.S.C. §119(e) of U.S. patent application Ser. No. 60/144,709 filed Jul. 20, 1999 naming Daryl Huff, et al. as inventor(s) and assigned to the assignee of the present application which is also incorporated herein by reference for all purposes. This application is related to the following co-pending U.S. Patent applications, which are filed concurrently with this application and each of which are herein incorporated by reference, (i) U.S. patent application Ser. No. 09/519,964, entitled "Methods and Apparatus for Automatically Generating a Routing Table in a Messaging Server" naming Belissent et al as inventors; (ii) U.S. patent application Ser. No. 09/521,281, entitled "Methods and Apparatus for Providing a Virtual Host in Electronic Messaging Servers" naming Belissent et al as inventors; (iii) U.S. patent application Ser. No. 09/520,864, entitled "Precedence Rules in Electronic Messaging Servers", naming Huff et al as inventors; and (iv) U.S. patent application Ser. No. 09/519,948, entitled "Methods and Apparatus for Delegating Administrative Capabilities to Domains Served by Email Providers", naming William Abbott, et al as inventors.

FIELD OF THE INVENTION

The present invention relates in general to client/server data communication systems and, more particularly, to a mail server included in an electronic mail system for use within a client/server data processing system. More particularly still, the present invention is directed towards a method and apparatus for monitoring electronic mail systems.

BACKGROUND OF THE INVENTION

Computer systems are well known in the art and have become a business staple and are also found in many homes. One feature available to the business world is that of using electronic mailing (email) to send and receive messages and other information to and from one another in a business setting. Similarly, home computers, such as desk tops or laptops, and other information devices, such as personal digital assistants (PDAs), allow telecommuting such that a user can connect to the user's work server and down load and upload messages.

The email system allows clients of a network system, which is maintained by a server system, to send messages or data from one user to another. In order to minimize disk space and requirements as well as to maximize functionality and consistency of the electronic mailing engine used in the network system, the engine is typically located on the server and is merely accessed by a client in order to send messages or retrieve messages to or from another user or client on the server system. In this way, the client system typically allows the user to perform such operations as composing, updating, and sending messages while the server in such a system provides, in part, a server based message repository as well as providing message transmission and reception functions for the user at the client level.

Figure 1:
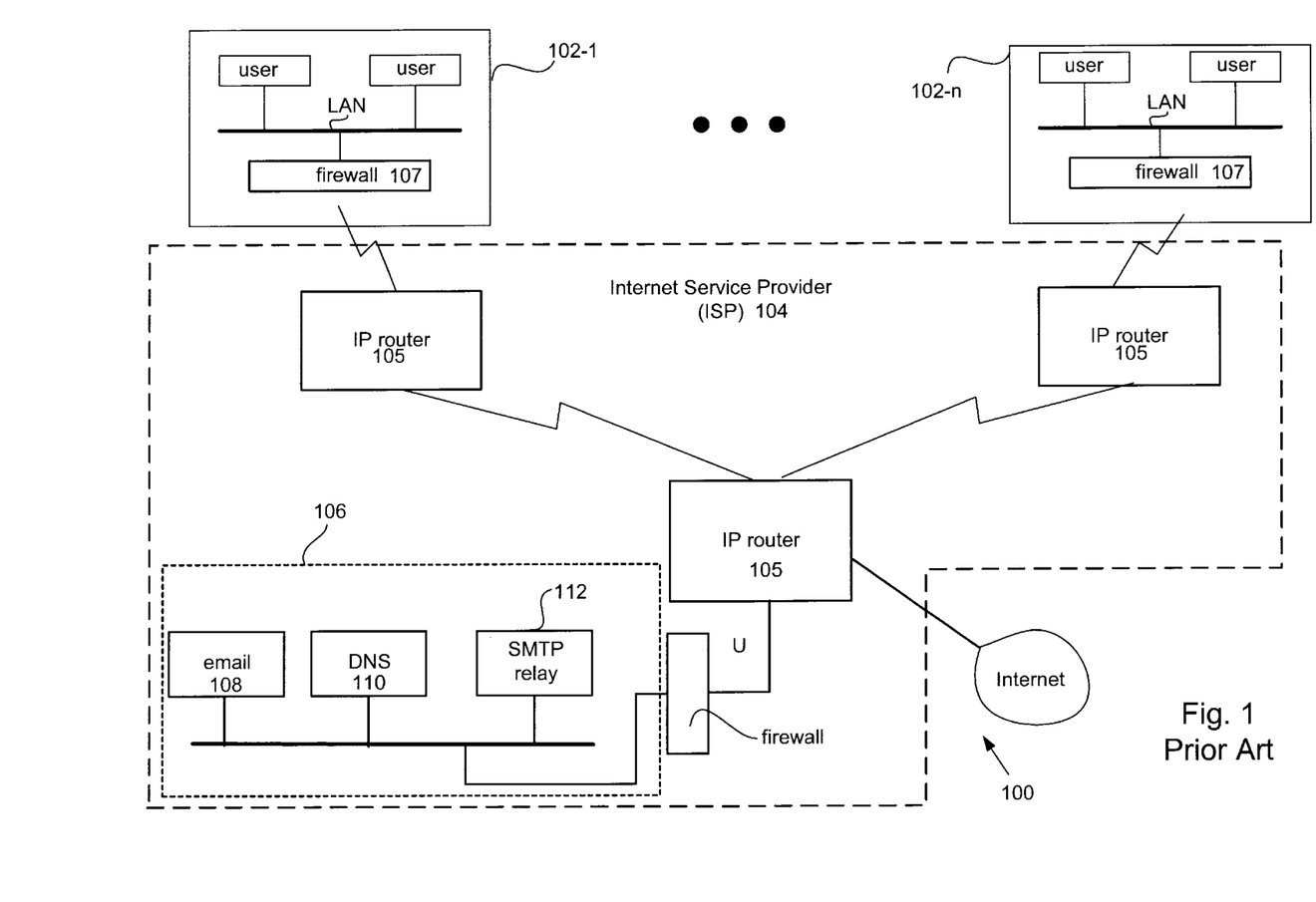
FIG. 1 illustrates a conventional customer hosted type e-mail system.

A traditional email system 100, configured to operate in what is referred to as a consumer host mode, is illustrated in FIG. 1. The email system 100 includes a number of consumers and/or businesses 102-1 ("abc.com") through 102-n ("xyz.gov") each of which is coupled to a service provider (SP) 104 ("isp.net"). Traditionally, the service provider (SP) 104 provides the various consumers and/or businesses 102 with just an unprotected IP router. The consumers and/or businesses 102 also operate and maintain their own application servers, including the email server, DNS server, and (if needed) LDAP server (not shown). For their own protection, each of the consumers and/or businesses 102 must operate through a firewall that filters out undesirable packets and insulates the organization's internal network from the Internet. Notice that for many organizations, especially small ones, the email server may actually be the firewall system.

In the email system 100, those consumers and/or businesses 102-1 through 102-n who wish to read their mail must be connected to a service provider (SP) email server 106. The SP 106 also operates an email mailbox 108, and a DNS server 110 that provides the following services, a primary master server for the SP's own domain (ISP.net), to designate as the root server for all consumers and/or businesses, act as a primary master server for consumers and/or businesses who do not wish to maintain their own public DNS server, and as a secondary server for consumers and/or businesses who prefer to maintain their own public server.

As part of the services provided by the SP 106, an SMTP relay host 112 that is managed by the SP offers a number of value added services, for which the SP may charge additional fees. In some cases, the relay host can be configured to allow the relay host to accept and hold the consumer's email when their mail server is down. However, unfortunately, the relay host imposes a significant management burden on the SP since in some cases, consumer email may live on this server for an indefinite time raising issues of backup and failure recovery. If one of the consumer servers fails because of being swamped, for example, then the consumer's email may roll over to the SP's relay host. Because of this, most SPs do not offer a relay host for those consumers and/or businesses that are hosting their own email server. The SP also provides a directory service in the form of the LDAP Directory server that is located at the consumer's site, which can be operated by the consumer. In this way, most organizations do not expose their LDAP servers to the public network for security reasons.

In the example shown in FIG. 1, a mail user in ABC, Inc. (which lawfully owns its DNS domain name abc.com, but relies on the ISP isp.net to host its email) desiring to send and receive mail uses the domain name username@aabc.com even though his mailserver is really mailhost.isp.net. It also means that any user in the abc.com domain, connects to a mailhost in the domain abc.com—for example mail.abc.com—to access his/her mail.

Since the email system 100 requires a separate mail server to be supported by the SP 106 for each of the domains abc.com through xyz.gov, although well understood and easy to manage, the email system 100 is not cost effective for small domains. In addition, as the number of domains increases, the management of the individual services becomes increasingly unwieldy. Internet service providers (ISPs) have a growing interest in hosting email services for always larger and more numerous organizations. Many businesses see the ability to farm out email services as a very attractive cost-saving idea. It is therefore desirable that an email service provider be able to offer email services to multiple organizations each of which has their own virtual domain and to support the ability to define such domains in the directory and host them on a shared mail server. Thus, an email architecture that can support a single mail server which, in turn, can support many different domains associated with consumers and/or businesses is desirable. Among other things, this email architecture would be useful for a mail service provider such as ISP 104.

In addition, it would be useful to provide monitoring capabilities for electronic mail systems that include a service provider serving several domains associated with different consumers and/or businesses. However, given the complexity of such an email system, it is typically difficult to isolate a problem. Furthermore, it would be desirable to provide a monitoring system that is capable of isolating and automatically alerting the users of problems that may exist with the electronic mail system.

In view of foregoing, there is a need to provide for methods and apparatus for monitoring electronic mail systems capable of supporting multiple domains.

SUMMARY OF THE INVENTION

According to the present invention, a standards-based messaging system is disclosed. The disclosed messaging system includes a mail server capable of offering email services to multiple organizations each of which has its own virtual domain. In addition, the messaging system is capable of providing monitoring capabilities that may be exercised locally be organizations that are served by the mail server. In accordance with one aspect of this invention, a messaging system including a monitoring system is disclosed. Advantageously, a remote user located in an organization served by a mail server, can perform a variety of monitoring tasks remotely. Furthermore, monitoring can be done automatically without requiring a local administrator to have knowledge about the specific implementation details about services such as IMAP, POP, SMTP, IDAP provided by the mail server.

As an email server having at least one email server component, an email performance parameter monitor for monitoring an email server component performance parameter associated with the email server component, one embodiment of the invention includes: a test message transmitter coupled to the mail server component suitably arranged to transmit a test message to the email server component; a component response message receiver coupled to the email performance parameter monitor suitably arranged to receive a component response message from the component that is based upon the test message; a comparator unit coupled to the component response message receiver arranged to determine the email server component performance parameter based upon the component response message and the test message; a data storage unit coupled to the comparator unit arranged to store the determined email server component performance parameter; and a display device coupled to the data storage unit for displaying the determined email server component performance parameter.

As a mail performance monitor suitable for monitoring the electronic mail services provided by an electronic mail server, one embodiment of the invention provides a monitoring interface suitable for initiating a set of monitoring commands to perform monitoring tasks associated with the mail services provided by one or more components of the mail server.

As a computer readable media including computer program code for monitoring electronic mail services provided by an electronic mail server, one embodiment of the invention includes computer program code for providing a monitoring interface that can be used to initiate a set of monitoring commands to perform monitoring tasks associated with the mail services provided by one or more components of the mail server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The Internet has effectively lowered the cost of electronic communication. As the number of people and organizations connected to the Internet has grown, the Internet has evolved into a new channel for communication. To facilitate Internet services, Internet messaging clients and easy-to-use web browsers have provided a cost-effective way of publishing and sharing information with employees inside the enterprise as well as customers, suppliers, and partners outside. Since messaging services has become crucial to enterprise infrastructure in the 1990s, organizations are seeking messaging solutions that provide a lower cost of ownership while increasing the effectiveness and reliability of their communications network. Specifically, they are evaluating the benefits of Internet standards-based messaging systems.

Broadly speaking, the invention describes an Internet standards-based messaging system having a mail server capable of offering email services to multiple organizations each of which has their own virtual domain. The invention is also able to define such virtual domains in the directory and host them on a shared email server. It should be noted that such a messaging system may provide other services such as calendar and voicemail.

In addition, the messaging system is capable of providing monitoring capabilities that may be exercised locally by organizations that are served by the mail server. In accordance with one aspect of this invention, a messaging system including a monitoring system is disclosed Advantageously, a remote user located in an organization served by a mail server, can access the directory services to perform a variety of monitoring tasks remotely. Furthermore, monitoring can be done automatically without requiring a local administrator to have knowledge about the specific implementation details about services such as IMAP, POP, SMTP, IDAP provided by the mail server.

The invention will now be described in terms of an internet mail server resident on a server computer coupled to a large network of mailboxes typical of a large corporate intranet system as well as a single user coupled to a large interconnected computer network such as the Internet. It should be noted, however, that the inventive mail server in the described embodiment is well suited to any application requiring highly reliable, scalable, and efficient information transport over a large number of computers.

Figure 2:
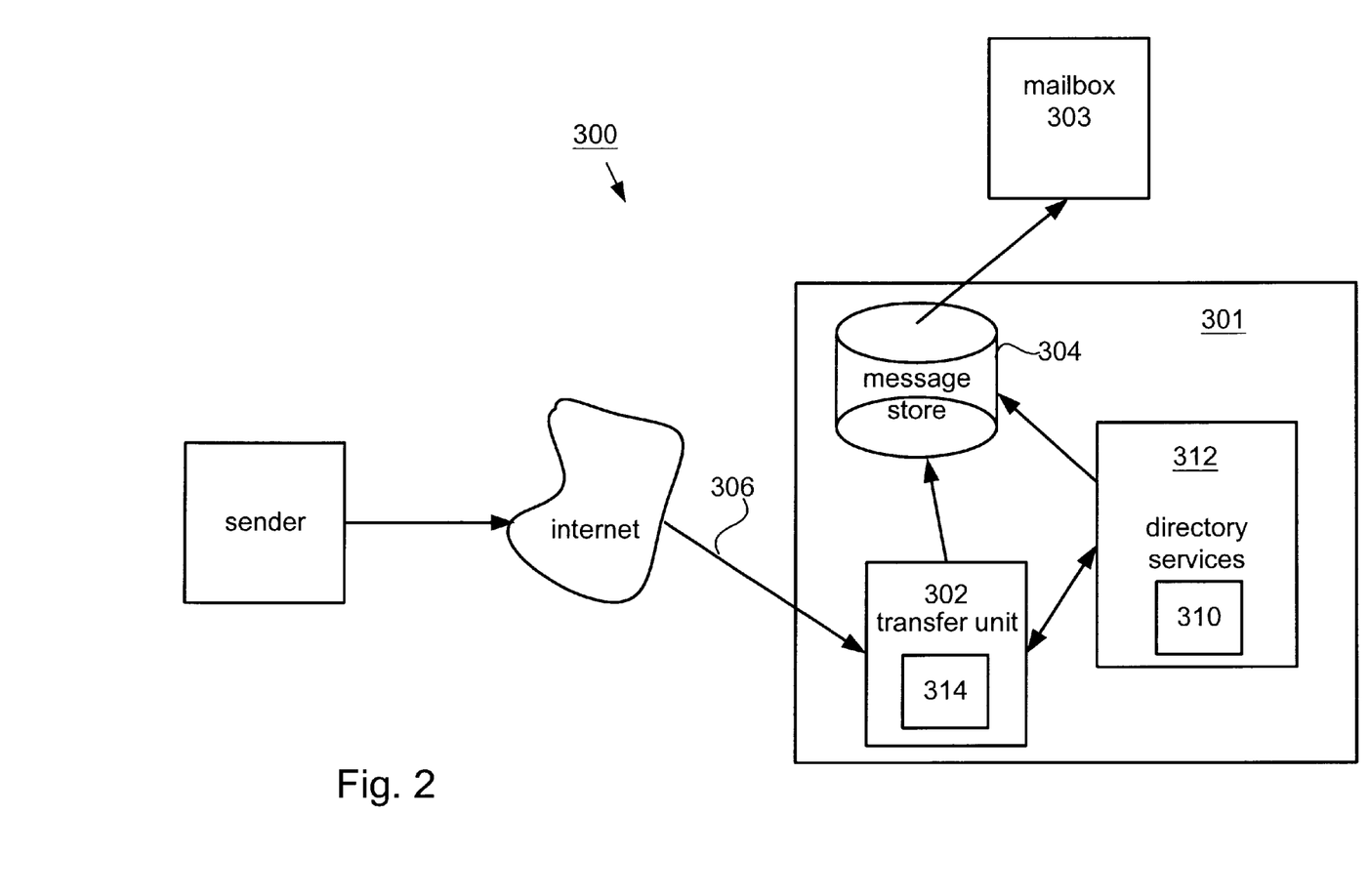
FIG. 2 shows an Internet email system in accordance with an embodiment of the invention.

Referring now to FIG. 2, an Internet email system 300 in accordance with an embodiment of the invention includes an Internet mail server 301 coupled to a user mailbox 303. In the described embodiment, the mail server 301 is a general-purpose, "store-and-forward" system for distributing computer-based mail. It should be noted that the term "store-and-forward" means that the mail server 301 automatically handles the receiving of mail messages necessitated when network links (such as those links 306 to the Internet) or other services are temporarily unavailable. In contrast to mail user agents (MUAs) that are used to create and read electronic mail messages, a transfer unit 302 included in the mail server 301 is responsible for directing messages to the appropriate network transport and ensuring reliable delivery over that transport. In a preferred embodiment, the mail server 301 includes a message store unit 304 coupled to the transfer unit 302 that is used to store messages for later transmission to the user mailbox 303.

Figure 3:
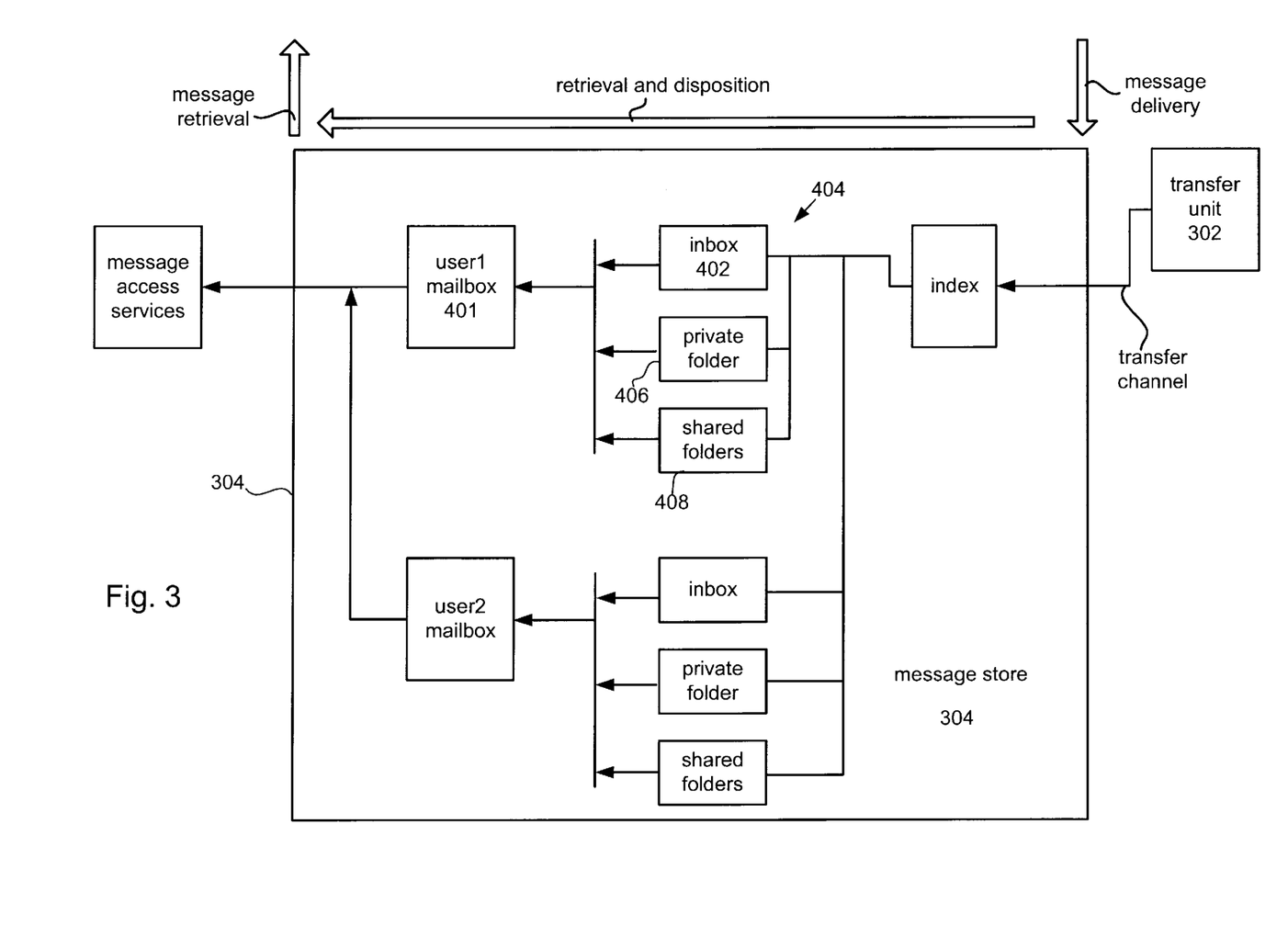
FIG. 3 shows an exemplary message store in accordance with an embodiment of the invention.

As shown in FIG. 3, in one implementation, the message store 304 in the mail server 301 is a dedicated data store for the delivery, retrieval, and manipulation of Internet mail messages. In a preferred embodiment, the message store works with the IMAP4 and POP3 to provide flexible and easy access to messaging. It saves any message that conforms to RFC 822 specifications, and recognizes the Multipurpose Internet Mail Extensions (MIME) content format.

In the described embodiment, the message store 304 is organized as a set of folders and user mailboxes. The mailbox 401 is a container for messages where each user has an inbox 402 where new mail arrives, and can have one or more folders 404 where mail can be stored. Folders 404 may contain other folders or mailboxes and may be arranged in a hierarchical tree. Mailboxes owned by an individual user are private folders 406. In addition to a user owning a folder or a mailbox, a common user or group can share the ownership of a folder or mailbox as a shared folder 408. A shared folder is similar to an email group, but instead of messages going into each member of the email group's inbox, messages addressed to the shared folder 408 go into a private folder associated with each user. It should be noted that in a preferred embodiment, the message store 304 maintains only one copy of each message. However, in those cases where the message store 304 receives a message addressed to multiple users or a group (based upon an associated distribution list), it adds a reference to the message in each user's inbox rather than having a copy of the message in each user's inbox, thereby saving disk space. In addition to the reference, the individual message's status (new, unread, replied to, deleted, and the like) is maintained per mailbox.

In the described embodiment, access to the message store 304 is multithreaded thereby allowing a single process to manage a large number of connections since each connection is handled by a thread. In this way, multithreaded access maximizes both performance and scalability by minimizing the system resources required for the management of each connection.

Referring back to FIG. 2, the delivery and routing of messages by the transfer unit 302 is based on a routing table 310 that in turn is derived from the user and group (distribution list) entries stored in a directory service unit 312. In a preferred embodiment, the directory service unit 312 is the central repository for meta-information: user profiles, distribution lists, and other system resources based upon, in some embodiments, a dedicated Lightweight Directory Access Protocol (LDAP) directory service. This directory supports the storage of information according to a directory information tree (DIT) which is a hierarchical structure that resembles a tree with one major branch at the top and many branches and sub-branches below. The arrangement of the tree is flexible, allowing administrators to decide how to best deploy the service for their organization. For some, it may be best to arrange the tree according the actual business organizational structure or geographic structure. For others, however, a one-to-one mapping to DNS layers may be best.

The DIT also provides the flexibility to support a wide range of administration scenarios, and can be administered in either a centralized or distributed manner. Centralized administration can be implemented where one authority manages the entire DIT. This type of administration is usually used in scenarios where the entire DIT resides on one mail server.

In order to properly route a message, the transfer unit 302 must access the directory information associated with each message that it processes. However, in a preferred embodiment, rather than querying the directory service 312 directly each time it processes a message, the transfer unit 302 caches the directory information in a directory cache 314. When the transfer unit processes a particular message, it accesses the appropriate directory information in the cache 314. When required, the transfer unit 302 uses the directory information in the cache 314 to update the routing table 312.

Since a directory query for each recipient of each message is time-consuming and puts a large load on the mail server 301, by implementing the localized directory cache 314, performance of the email server 301 is improved. In addition, since the information stored in the directory service unit 310 is not always in the format required by the transfer unit 302, when creating the cache, the transfer unit reformats the directory information as required.

It should be noted that in most embodiments, the transfer unit 302 can be configured to adhere to various mail delivery options which specify one or more delivery options for inbound email to a designated recipient. While inbound messages can be delivered into multiple message stores, message access servers (MAS) can read messages from only a designated one of them. The transfer unit 302 uses these attributes to determine the targets of message delivery for all messages submitted to a particular distribution list. Such attributes can include, but are not limited to: "autoreply", "program" where mail is delivered to a program, "forward" where mail is forwarded to another mailbox(es), "file" where the incoming message file is appended to another file, and "shared" where mail is delivered to a shared mailbox (this is typically used to set up a shared mailbox for a distribution list).

In the context of electronic mail, protocols are generally a high-level (not necessarily network specific) language spoken between two mailers. Transports are the low-level, network specific details used to implement a protocol on a given network. Thus email messages can come in to the transfer unit 302 by any one of a variety of transports and protocols—submitted directly by a local user, via TCP/IP as an SMTP message from an Internet system, by using a dial-up modem using the PhoneNet protocol, DECnet as a MAIL-11 message, DECnet as an SMTP message, UUCP, an X.400 transport, SNA, and so on. The transfer unit 302 then routes the message out using a transport and protocol appropriate for the message's destination address.

In the described embodiment, the transfer unit 302 uses what are referred to as channels to implement specific combinations of transports and protocols. Each different transport and protocol combination has an associated transfer unit channel. The transfer unit 302 postmaster initially configures the transfer unit 302 telling it what sorts of transports and protocols are in use at his site, and what sorts of destination addresses should be routed through which sorts of channels. For instance, at sites with an Internet connection, Internet addresses are normally routed through an SMTP over TCP/IP channel; but at sites with only a UUCP connection, Internet addresses would instead be routed through a UUCP channel. Once the transfer unit 302 is so configured using configuration data stored in a configuration table (not shown), the transfer unit 302 handles message routing and delivery automatically. In this way, ordinary users need never be aware of this underlying transport and routing; that is, they simply address and send their messages and the transfer unit 302 automatically routes and delivers them appropriately.

In most embodiments, the transfer unit 302 stores messages as text files. Messages with multiple parts (possibly containing different types of data) are represented as a series of text sections separated by special unique delimiter strings. In the described embodiment, the first few files in each email message are referred to as the message envelope that contains transport information. The message envelope is terminated by a line containing a boundary marker, or by a line containing two CTRL/A characters. The transfer unit 302 uses the contents of the envelope to make routing decisions. It does not use the content of the message. The content of the envelope is primarily defined by RFC 821. It includes the originator address, the recipient(s) address(es), and envelope ID.

The header lines of the message follow the envelope whose format is mandated by RFC 822. It should be noted that there may be any number of message header lines; the message header formed by this collection of header lines is terminated by a single blank line after which follows the message body. An Internet mail message starts with one or more headers. Each header is composed of a field name followed by a colon then a value which can be generated by, for example, the composer of a message or the mail client. A transfer unit can also add headers to a message. Each transfer unit that accepts a message adds a received header to that message. The last transfer unit to accept the message and to actually deliver the message to the message store adds a return-path header. The received and return-path headers provide information that enables you to trace the routing path taken by the message if a problem occurs.

Submitted messages from the Internet or local clients go to the transfer unit 302 via SMTP (Simple Mail Transport Protocol). If the message address is within the server 302 domain, the transfer unit 302 delivers the message to the message store 304. If, however, the message is addressed to another domain, the transfer unit 302 relays the message to another transport agent on the Internet or Intranet.

In a preferred embodiment, messages to the local domain are stored in the message store 304 depending on how the system is configured. Once messages are delivered to the appropriate mailbox, they can be retrieved, searched for, and manipulated by IMAP4 or POP3-based mail clients. The transfer unit 302 uses the directory 312 that, in a preferred embodiment, is configured as an LDAP type directory, to retrieve local user and group address information. When the transfer unit 302 receives a message, it uses the directory information to determine where the message should be delivered. The message store uses the directory services to authenticate users logging into their mailboxes. The message store 304 also obtains information about user message quota limits and message store type (IMAP or POP). Outgoing client messages go to the SMTP channel in the LDAP. The transfer unit 302 sends the message to an Internet transfer or, if the address is local, to the message store 304. It should be noted that the LDAP directory 312 is the master repository of all the information related to hosted domains. That is, the message access server retrieves the necessary information to associate a client with a domain from the LDAP directory 312. Similarly, the transfer unit 302 retrieves hosted domain information from the LDAP directory 312 to perform proper routing and address rewriting.

Figure 4:
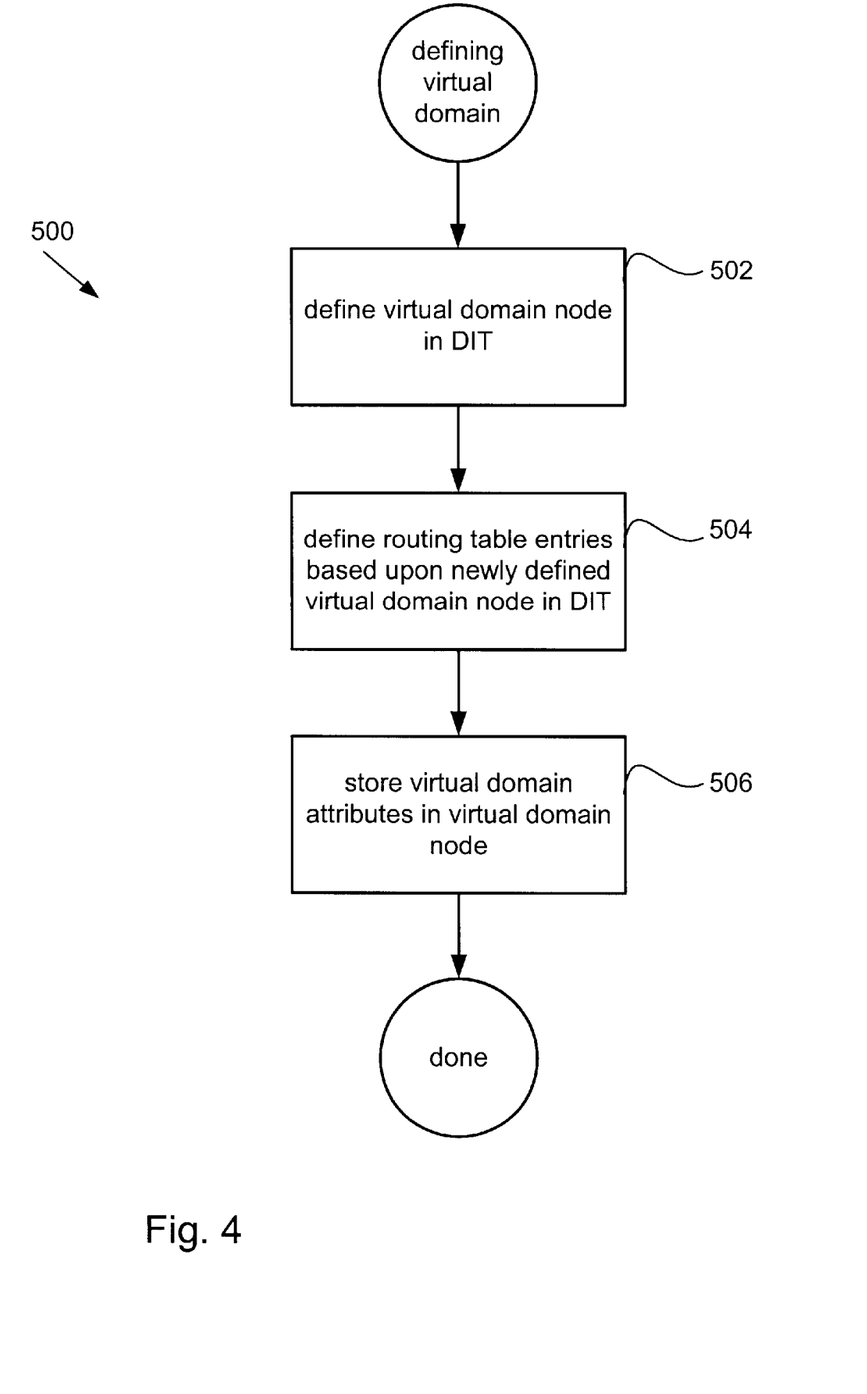
FIG. 4 shows a flowchart detailing a process whereby a virtual domain is defined in accordance with an embodiment of the invention.

Referring now to FIG. 4, showing a flowchart that details a process 500 for defining a virtual domain in accordance with an embodiment of the invention. The process 500 begins at 502 by defining a virtual domain node in the DIT. Once the virtual domain node has been defined, corresponding routing table entries are defined at 504 and at 506, various virtual domain attributes are stored at the virtual domain node. It should be noted that the various virtual domain attributes include a list of services permitted the domain. Such services include IMAP, MAPS, POP3, POP3S, SMTP which, in some cases requires presentation of credentials. Other of the services includes identification of a domain administrator who is authorized to manage the particular virtual domain which includes setting particular user-level attributes for particular users in the domain.

Figure 5:
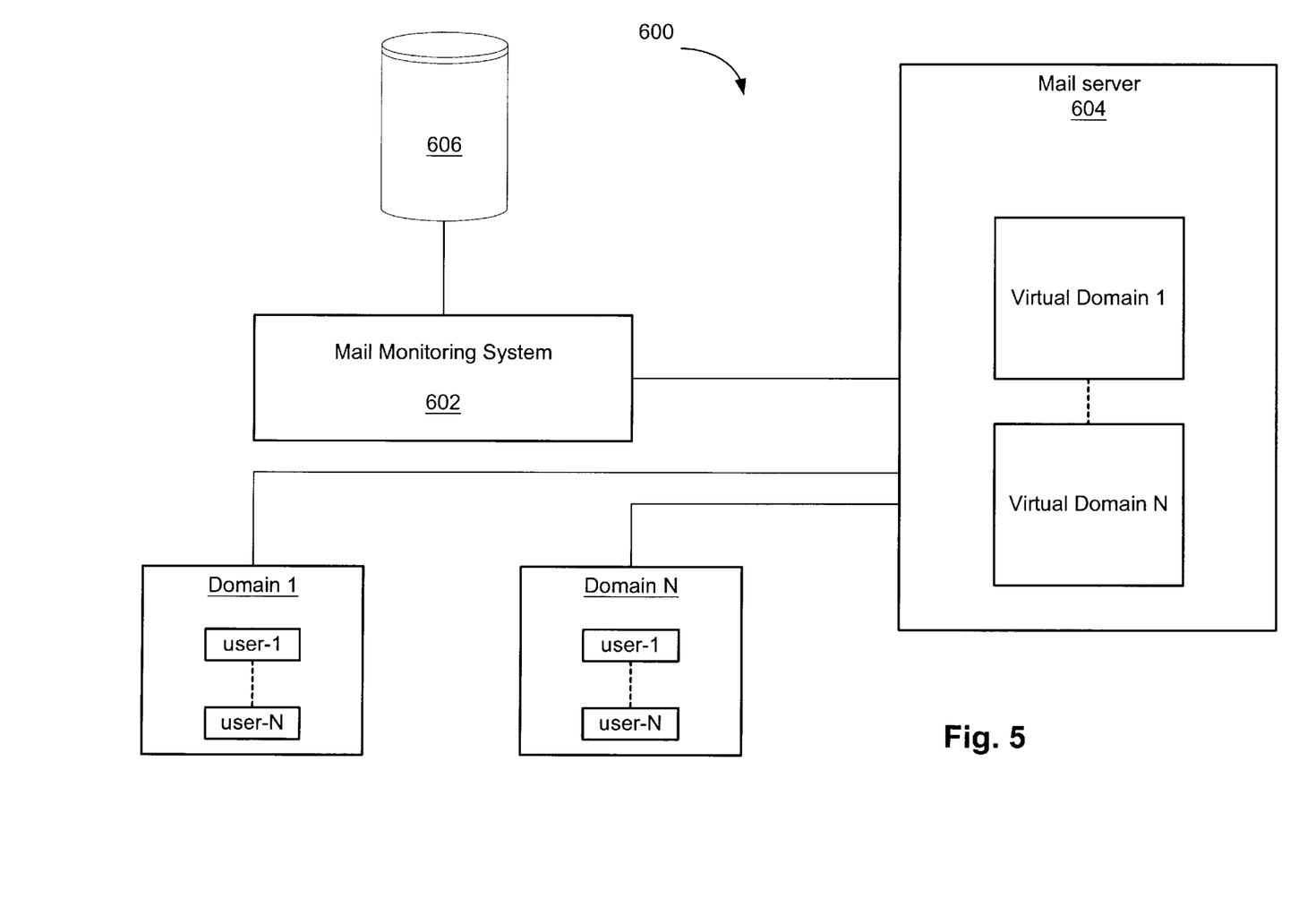
FIG. 5 illustrates a messaging system including a mail monitoring system coupled to a mail server, in accordance with an embodiment of the invention

FIG. 5 illustrates a messaging system 600 including a mail monitoring system 602 coupled to a mail server 604 in accordance with one embodiment of the invention. In the described embodiment, the mail server 604 provides mail service to $domain_1$–$domain_n$, each of which is associated with a virtual domain in the mail server 604. In this way, the mail server 604 provides mail service to these domains each of which, in turn, provides email services for several users ($user_1$–$user_n$) included therein.

In the mail messaging system 600, it is possible to monitor various components that make up the system. By way of example, the mail monitoring system 602 can be used in conjunction with the mail server 604 to determine whether mail service components such as transfer units, message stores, directory services are operating (or available for operation). In addition, the response time of various components of the mail messaging system 600 can be measured by the mail monitoring system 602. The mail monitoring system 602 can provide information about resources such as disk space, virtual memory, etc. Furthermore, security of the messaging system can be monitored and notification of attempts to breach the security can be provided.

The mail monitoring system 602 is coupled to a data storage device 606. Information about significant events in the operation of the mail messaging system 600 can be captured by the mail monitoring system 602 and stored in the data storage device 606. In one embodiment, the information is captured in various log files. Since manual analysis of log files is impractical, the mail monitoring system 602 provides a number of monitoring tools that can extract information from the log files to perform useful analysis. For example, the extracted information can be used to determine number of connections that were established in a particular day, the total number of connections that were lost, and so on. In addition, error information can be captured and provided by the mail monitoring system 602. In one embodiment, errors are logged in error log files that are stored in the data storage device 606. The stored log files can be analyzed by the mail monitoring system 602 to provide useful diagnostic information.

In addition to error logging, the mail monitoring system 602 can be used to determine the response time of various components of the mail server 604. In accordance with one embodiment of the present invention, the mail monitoring system 602 initiates test e-mails to measure the overall responsiveness of the mail messaging system 600, as well as the responsiveness of individual service components such as, POP, IMAP, LDAP, and SMTP associated with the mail server 604. In this way, the mail monitoring system 602 can isolate a performance related problem(s) with the mail servers 604.

In addition to determining the responsiveness of the mail servers 604, the mail monitoring system 602 is capable of providing notification when a problem is identified. In one embodiment, a measured response time is compared with threshold values that indicate what the normal response time should be. By way of example, these threshold values can be the expected times for LDAP response, POP/IMAP retrieval time, total round trip for test emails, etc.

Figure 6:
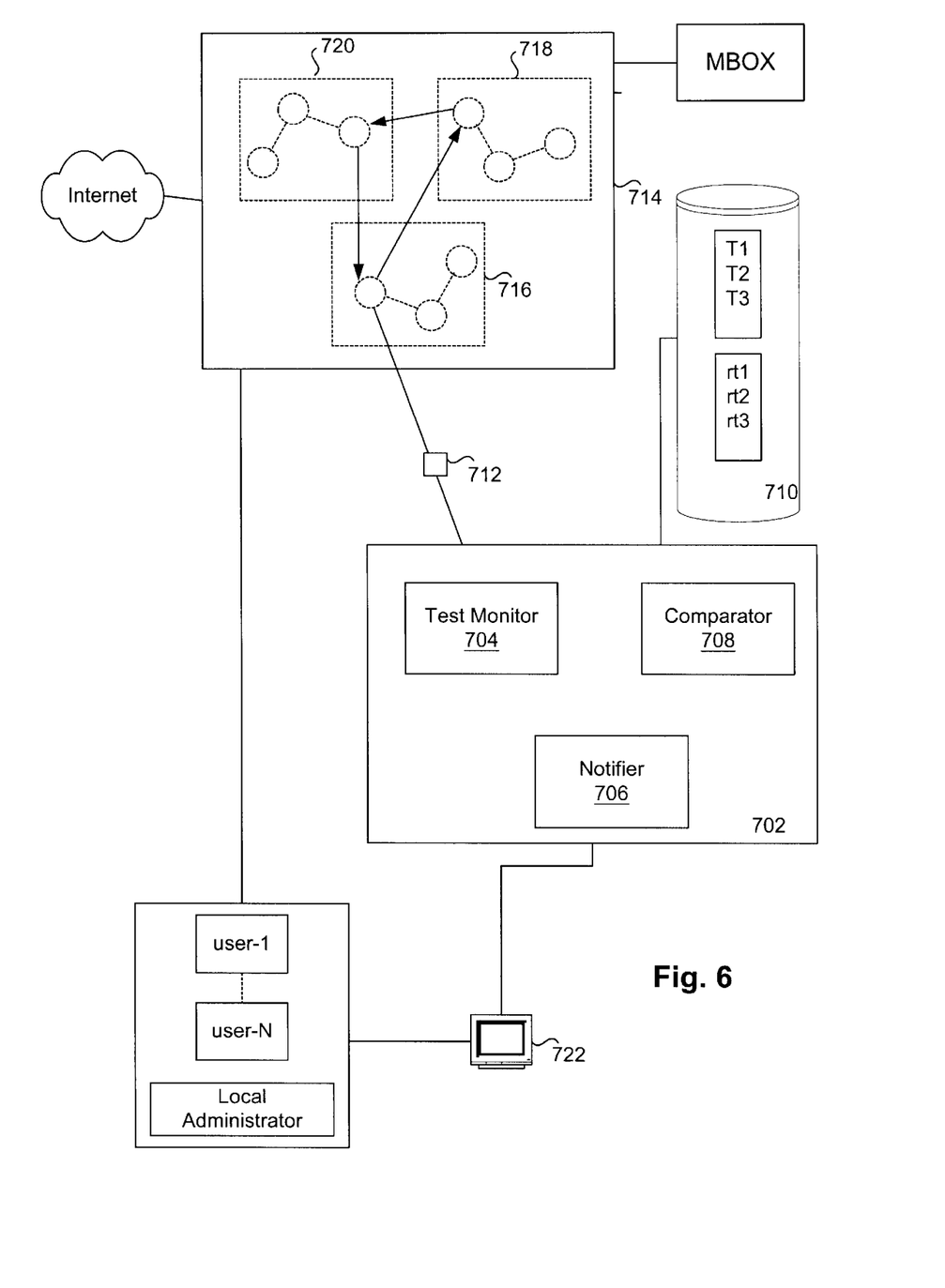
FIG. 6 illustrates an exemplary mail monitoring system, in accordance with one embodiment of the present invention.

FIG. 6 illustrates an exemplary mail monitoring system 702, in accordance with one embodiment of the present invention. The mail monitoring system 702 includes a test/monitor 704, a notifier 706, and a comparator 708. As shown in FIG. 6, the mail monitoring system is coupled to a data storage device 710 where threshold values T1, T2, and T3 can be stored. As mentioned earlier, the threshold values T1, T2, and T3 could represent the expected response times under normal conditions for an e-mail system. It should be noted that the threshold values may vary for different configurations and there may be different expected values for the same configuration depending on other factors. For example, the response time during business hours may have a longer threshold than the response times expected during weekends. In any case, appropriate threshold values can be can be selected and stored in data storage device 710.

In one implementation, the test/monitor 704 can initiate a test email 712 to determine whether a mail messaging system is functioning according to the expected threshold. By doing so, the test email 712 travels through a distributed messaging system. As shown in FIG. 6, different components of an email server 714, for example, a transfer unit, a message store, a directory service can exist on different servers such as servers 716, 718, and 720. After initiating the test e-mail 712, test/monitor 704 can measure the actual response times rt1, rt2, and rt3 corresponding to individual components of the distributed email server 714. The measured response times rt1, rt2, and rt3 can be stored in the data storage device 710, by the test/monitor 704. Once actual response values have been determined, the comparator 708 can access data storage device 710 to compare actual response times rt1, rt2, rt3 with their corresponding threshold values T1, T2, and T3.

In one embodiment, the mail monitoring system 702 may be invoked by a local system administer who desires to identify a problem with the mail services provided by the mail server 714. In this way, the mail monitoring system can be configured to automatically check the status of an email system by measuring actual response values and comparing them with the corresponding threshold values. If a problem is detected, for example, when an actual response time is slower than the excepted threshold value, the comparator 708 can send a signal with appropriate information to the notifier 706. An error notification with the appropriate information can be displayed on a monitoring screen 722 that is connected to the notifier 706. In this way, a human operator can be expeditiously notified of an isolated problem with the mail services.

In addition, a user, such as a system administrator, may interact with the monitoring screen 722 to perform monitoring tasks. In one embodiment, monitoring commands can be issued to perform various monitoring tasks such as determining the size of queues for the transfer unit channels, checking the status of the system resources, providing a summary of Mail submitters, etc.

Figure 7:
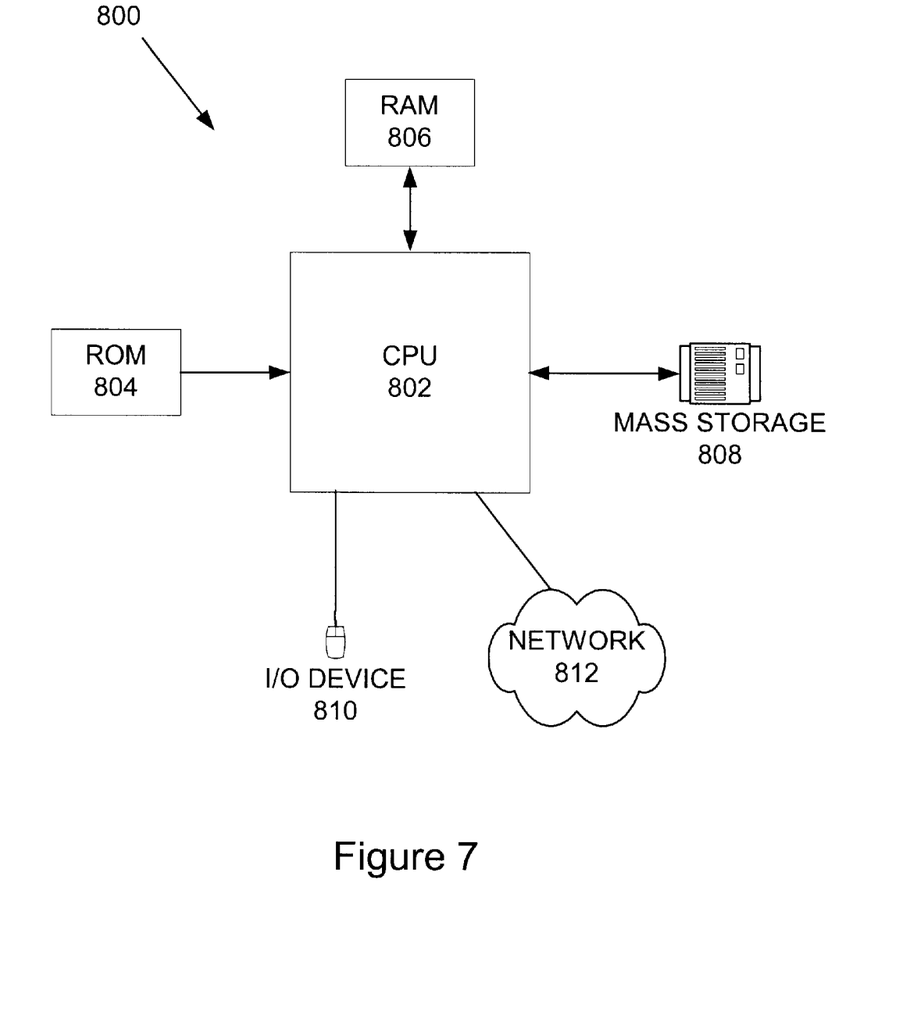
FIG. 7 illustrates a typical general-purpose computer system suitable for implementing the present invention.

FIG. 7 illustrates a typical, general-purpose computer system 800 suitable for implementing the present invention. The computer system 800 includes any number of processors 802 (also referred to as central processing units, or CPUs) that are coupled to memory devices including primary storage devices 804 (typically a read only memory, or ROM) and primary storage devices 806 (typically a random access memory, or RAM).

As is well known in the art, ROM acts to transfer data and instructions uni-directionally to the CPUs 802, while RAM is used typically to transfer data and instructions in a bi-directional manner. CPUs 802 may generally include any number of processors. Both primary storage devices 804, 806 may include any suitable computer-readable media. A secondary storage medium 808, which is typically a mass memory device, is also coupled bi-directionally to CPUs 802 and provides additional data storage capacity. The mass memory device 808 is a computer-readable medium that may be used to store programs including computer code, data, and the like. Typically, mass memory device 808 is a storage medium such as a hard disk or a tape which is generally slower than primary storage devices 804, 806. Mass memory storage device 808 may take the form of a magnetic or paper tape reader or some other well-known device. It will be appreciated that the information retained within the mass memory device 808, may, in appropriate cases, be incorporated in standard fashion as part of RAM 806 as virtual memory. A specific primary storage device 804 such as a CD-ROM may also pass data uni-directionally to the CPUs 802.

CPUs 802 are also coupled to one or more input/output devices 810 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 802 optionally may be coupled to a computer or telecommunications network, e.g., an Internet network or an intranet network, using a network connection as shown generally at 812. With such a network connection, it is contemplated that the CPUs 802 might receive information from the network, or might output information to the network in the course of performing the above-described method steps. Such information, which is often represented as a sequence of instructions to be executed using CPUs 802, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. In a messaging system having a message server arranged to process messages for hosts in multiple host domains and that includes at least one message server component, a message server performance parameter monitor for monitoring a message server component performance parameter associated with the message server component, comprising:

a test message transmitter coupled to the message server component suitably arranged to transmit a test message to the message server component, wherein the test message corresponds to one of the multiple host domains;

a component message receiver coupled to the message performance parameter monitor suitably arranged to receive a component response message from the component that is based upon the test message;

an evaluator unit coupled to the component response message receiver arranged to determine the message server component performance parameter based upon the component response message and the test message;

a data store unit coupled to a comparator unit arranged to store the determined message server component performance parameter; and a display device coupled to the data storage unit for displaying the determined message server component performance parameter.

2. A monitor as recited in claim 1, wherein the message is an email message and wherein the message server is an email server and wherein the message server component is an email server component.

3. A monitor as recited in claim 2, wherein the performance parameter is one of a plurality of email component performance parameters and wherein the email server component is one of a plurality of interconnected email server components.

4. A monitor as recited in claim 3, wherein at least one of the plurality of email server component performance parameters is a component response time.

5. A monitor as recited in claim 4, wherein the component response time is based upon a time period between the transmission of the test message from the test message transmitter and the receiving of the component response message by the component response message receiver as determined by the comparator.

6. A monitor as recited in claim 5, wherein the component response time is periodically recalculated.

7. A monitor as recited in claim 6,
    wherein the email performance parameter monitor compares at least one of the periodically calculated response times with a threshold value response time that represents a response time expectation value; and
    wherein the email performance parameter monitor operates to provide an error notification when the at least one measured response time exceeds the threshold value response time.

8. A monitor as recited in claim 2, wherein the mail server component is selected from the group comprising a transfer unit, a messaging store, and a directory server.

9. A monitor as recited in claim 2, wherein the mail performance monitor operates to monitor various virtual domain attributes associated with the one or more virtual host domains.

10. A monitor as recited in claim 9, wherein the various virtual domain attributes include IMAP, IMAPS, POP3, POP3S, LDAP, and SMTP.

11. A monitor as recited in claim 2, wherein the monitor operates to log email activities associated with one or more virtual host domains in the data storage.

12. A mail performance monitor as recited in claim 2, wherein the monitor operates to display monitoring information associated with one or more virtual host domains.

13. In an electronic messaging system,
    a mail performance monitor suitable for monitoring the electronic mail services provided by an electronic mail server arranged to process mail messages for hosts in multiple host domains, the mail performance monitor providing a monitoring interface that can be used to initiate a set of monitoring commands to perform monitoring tasks associated with the mail services provided by one or more components of the mail server.

14. A mail performance monitor as recited in claim 13, wherein the set of the monitoring commands provides the ability to initiate a test mail message; and wherein the monitoring interface can provide measurements of response times associated with of one or more components of the mail server when the test mail is initiated.

15. A mail performance monitor as recited in claim 14, wherein the set of the monitoring commands provides the ability to capture activities associated with one or more virtual host domains of the mail server in one or more log files; and wherein the monitoring interface provides tools that can be used to analyze the one or more log files to generate error notifications.

16. A mail performance monitor as recited in claim 15, wherein the monitoring interface provides error notification for the mail services provided through one or more virtual host domains of the electronic mail server.

17. A mail performance monitor as recited in claim 16, wherein the set of the monitoring commands can be initiated to provide information about mail messaging resources associated with the mail server.

18. A computer readable media including computer program code for monitoring electronic mail services provided by a mail server for hosts in multiple host domains, the computer program code providing a monitoring interface that can be used to initiate a set of monitoring commands to perform monitoring tasks associated with the mail services provided by one or more components of the mail server.

19. A computer readable media as recited in claim 18, wherein the computer readable media further comprises:
    computer program code for capturing activities of one or more virtual host domains of the electronic mail server in one or more log files;
    computer program code for analyzing the one or more log files; and
    computer program code for generating error notifications based on the analyzing the one or more log files.

20. A computer readable media as recited in claim 19, wherein the computer readable media further comprises:
    computer program code for measuring response times associated with one or more components of the mail server.

* * * * *